Figure 1:
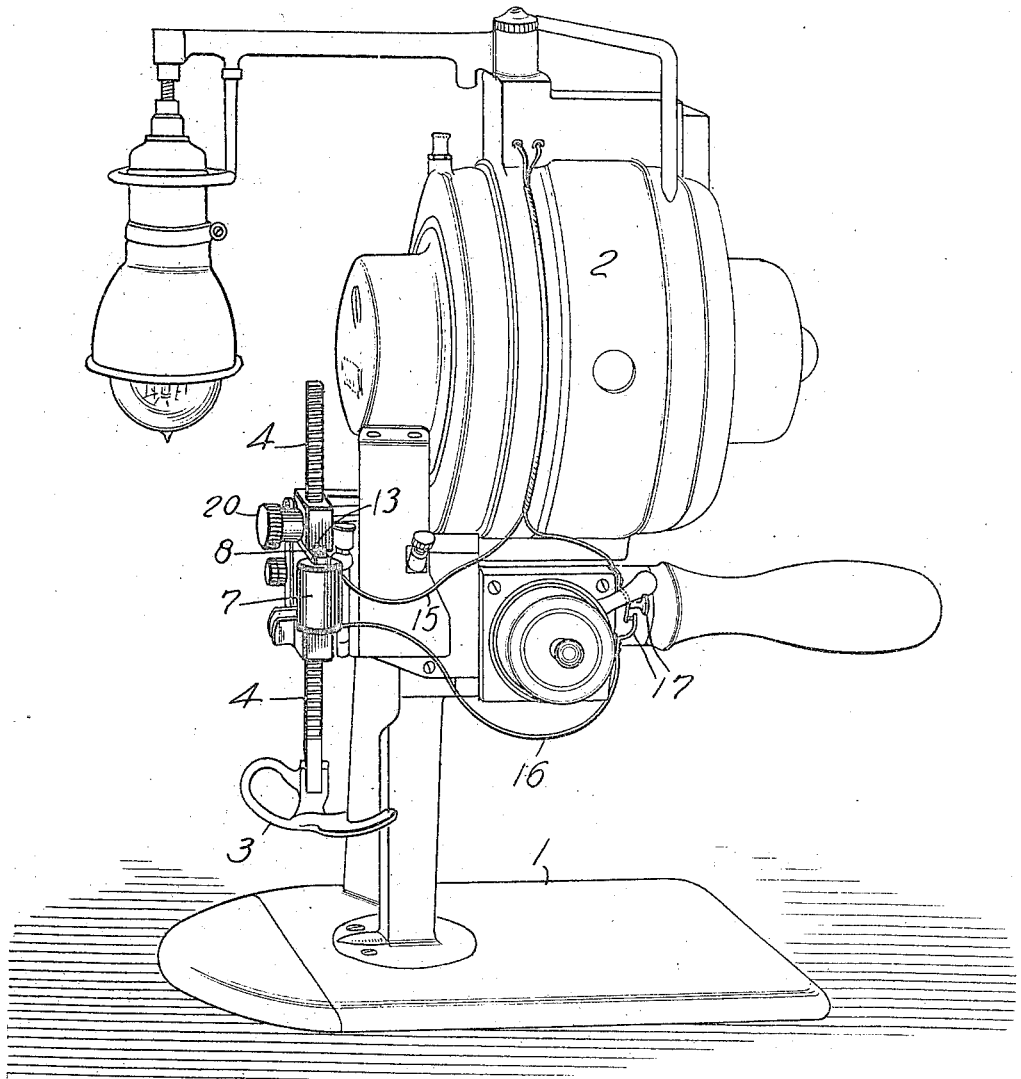

E. W. BREINING.
PRESSER FOOT LOCK.
APPLICATION FILED APR. 19, 1917.

1,253,134.

Patented Jan. 8, 1918.
2 SHEETS—SHEET 1.

WITNESSES

INVENTOR
EDWARD W. BREINING,
BY
ATTORNEYS

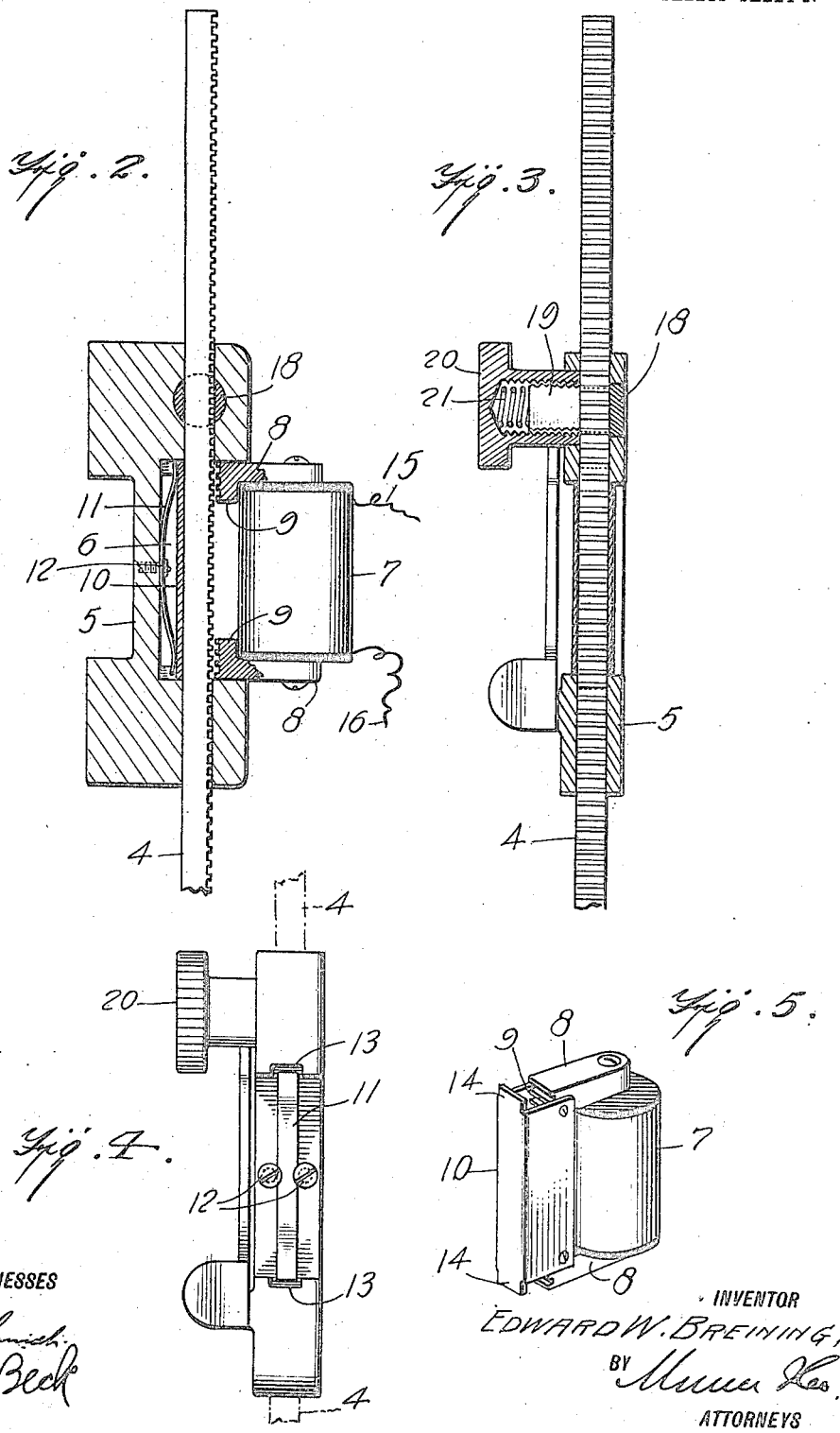

UNITED STATES PATENT OFFICE.

EDWARD W. BREINING, OF BELLEVUE, KENTUCKY.

PRESSER-FOOT LOCK.

1,253,134.

Specification of Letters Patent.

Patented Jan. 8, 1918.

Application filed April 19, 1917. Serial No. 163,318.

*To all whom it may concern:*

Be it known that I, EDWARD W. BREINING, a citizen of the United States, and a resident of Bellevue, in the county of Campbell and State of Kentucky, have invented a new and useful Improvement in Presser-Foot Locks, of which the following is a specification.

My invention is an improvement in presser foot locks and has for its object to provide electrically controlled mechanism for positively locking the presser foot of a cloth cutting machine, when the machine is in operation.

In the drawings:—

Figure 1 is a perspective view of a cutting machine provided with the improved lock, Fig. 2 is a vertical section through the presser foot support, Fig. 3 is a section at right angles to Fig. 2, Fig. 4 is a rear view of the support with the locking mechanism removed, Fig. 5 is a perspective view of the locking mechanism.

The present embodiment of the invention is shown in connection with a cutting machine 1 having the motor 2, and the presser foot 3 is connected to one end of a rack bar 4 which is mounted to slide in a support 5 secured to the frame of the machine in any suitable or desired manner. The support 5 is cut away intermediate its ends to form a recess 6 through which the rack bar 4 extends, and the locking mechanism for the presser bar is arranged within this recess, the recess being open at that side of the bar provided with the teeth.

The locking mechanism comprises an electro-magnet 7 having secured to each end of its core a pawl 8, the said pawls extending laterally from the magnet and having teeth at their outer ends for engaging the teeth of the rack bar. It will be noticed that each bar has an extension 9 at its inner face and outside the electro-magnet the said extensions extending toward each other and a substantially U-shaped casing 10 is connected with these extensions, the casing embracing the rack bar, and having the edges of its side walls secured to the extensions 9. This casing fits within the recess 6 as shown in Fig. 2, and the body of the casing 10 is spaced far enough from the pawls 8 to permit the pawls to move out of contact with the teeth of the rack bar.

A plate spring 11 is arranged within the recess at the bottom thereof being secured to the bottom wall of the recess by screws 12, the said screws being arranged on opposite sides of the spring, with their heads engaging over the spring, and the ends of the spring engage in grooves 13 in the upper and lower end walls of the recess. The pawls 8 also fit in these grooves 13 as do the ends of the body of the U-shaped casing, the said ends being extended as shown at 14 to engage the grooves. The spring 11 is arched as shown, the free ends engaging the casing 10, and acting normally to press the said casing out of the recess, or in the position of Fig. 2.

The electro-magnet is supplied with current by means of lead wires 15 and 16 which derive current from the motor and in the lead wire 16 a switch is interposed, the said switch being indicated at 17. The switch is normally spring held in closed position, so that the circuit is closed until it is intentionally opened.

In Fig. 3 is shown the usual mechanism for locking the presser foot in adjusted position. This mechanism comprises a screw 18 extending through an opening in the support 5 at the rack bar and notched or recessed longitudinally as shown at 19 to receive the rack bar. A nut 20 in the form of a cap engages the screw 18, and a coil spring 21 is arranged between the nut and screw for forcing the nut and screw apart. The inner end of the nut engages the rack bar on one face and the screw on the other, and it will be evident that when the nut is tightened on the screw the rack bar will be clamped.

In operation when the motor is running, that is, when the current is on, the electro-magnet will be energized and since the rack bar is of metal, the pawls 8 which are extensions of the core will be drawn toward the rack bar as an armature and will engage the teeth thereof to positively prevent movement of the rack bar in either direction. When it is desired to release the current this may be done by the switch 17 and the spring 11 will immediately force the casing 10 which is a support for the electro-magnet and its connections, outward thus releasing the rack bar.

I claim:—

1. In a cutting machine, the combination with the rack bar supporting the presser foot, and the support through which the rack bar is movable, and having a central recess intermediate its ends, of an electro-magnet, pawls secured to the ends of the core of the magnet and having teeth for engaging the teeth of the rack bar, a U-shaped casing within the recess and embracing the rack bar and connected to the pawls, a spring normally pressing the casing, pawls and magnet outwardly to disengage the pawls from the rack bar, said pawls being adapted to be moved toward the rack bar by the current flowing through the magnet, a circuit for the magnet supplied by the motor circuit of the cutter motor and having a normally spring closed switch, for the purpose specified.

2. In a cutting machine, the combination with the rack bar supporting the presser foot, and the support through which the rack bar is movable, of an electromagnet having pawls secured to the ends of the core of the magnet for engaging the teeth of the rack bar, a spring normally pressing the electro-magnet and the pawls away from the rack bar, and a circuit for the magnet supplied by the motor circuit of the cutter motor for moving the magnet and the pawls toward the rack bar when the cutter is electrically connected or in operation, and a cut-out switch for the said circuit.

3. In a cutting machine, the combination with the rack bar supporting the presser foot, and the support through which the rack bar is movable, of an electro-magnet having pawls secured to the ends of the core of the magnet for engaging the teeth of the rack bar, a spring normally pressing the electro-magnet and the pawls away from the rack bar, and a circuit for the magnet supplied by the motor circuit of the cutter motor for moving the magnet and the pawls toward the rack bar when the cutter bar is in operation.

4. In a cutting machine, the combination with a rack bar supporting a presser foot and the support through which the rack bar is movable, and having a central recess intermediate its ends, of a locking member having at each end a pawl, the pawls having teeth for engaging the teeth of the rack bar, a U-shaped casing within the recess and embracing the rack bar and connected to the pawls, a spring normally pressing the said casing, pawls and locking member outwardly to disengage the pawls from the rack bar, and electrically controlled means for moving the pawls and supporting member toward the rack bar.

EDWARD W. BREINING.

Witnesses:
CLARENCE H. RUFF,
OSCAR A. BERMAN.